(12) United States Patent
Bitauld

(10) Patent No.: US 11,828,592 B2
(45) Date of Patent: Nov. 28, 2023

(54) APPARATUS WITH CANTILEVER LIGHT GUIDE

(71) Applicant: Nokia Technologies Oy, Espoo (FI)

(72) Inventor: David Bitauld, Massy (FR)

(73) Assignee: Nokia Technologies Oy, Espoo (FI)

( * ) Notice: Subject to any disclaimer, the term of this patent is extended or adjusted under 35 U.S.C. 154(b) by 250 days.

(21) Appl. No.: 16/841,152

(22) Filed: Apr. 6, 2020

(65) Prior Publication Data

US 2020/0318943 A1 Oct. 8, 2020

(30) Foreign Application Priority Data

Apr. 8, 2019 (EP) ..................................... 19167851

(51) Int. Cl.
| | | |
|---|---|---|
| *G01B 11/02* | (2006.01) | |
| *G01B 9/02* | (2022.01) | |
| *G01B 9/02015* | (2022.01) | |
| *G02B 6/42* | (2006.01) | |

(52) U.S. Cl.
CPC ..... *G01B 9/02051* (2013.01); *G01B 9/02027* (2013.01); *G02B 6/4214* (2013.01); *G02B 6/4246* (2013.01)

(58) Field of Classification Search
CPC ............ G01B 9/02027; G01B 9/02051; G01B 11/161; G02B 6/4214; G02B 6/4246; G01N 21/1702; G01N 29/022; G01N 29/2425; G01P 15/093; G01Q 20/02; G01Q 20/04
See application file for complete search history.

(56) References Cited

U.S. PATENT DOCUMENTS

| | | | |
|---|---|---|---|
| 5,231,286 A | | 7/1993 | Kajimura et al. |
| 5,260,567 A | * | 11/1993 | Kuroda ............. G01B 9/02051 |
| 5,274,230 A | * | 12/1993 | Kajimura ............... B82Y 35/00 |
| | | | 977/869 |
| 5,289,004 A | * | 2/1994 | Okada .................... G01Q 60/12 |
| | | | 977/863 |

(Continued)

FOREIGN PATENT DOCUMENTS

| | | |
|---|---|---|
| EP | 1843133 A1 | 10/2007 |
| JP | H04131710 A | 5/1992 |

(Continued)

OTHER PUBLICATIONS

Cooper et al., "Integrated Optical Dual-Cantilever Arrays in Silica on Silicon", Optics Express, vol. 22, No. 26, 2014, pp. 31801-31813.

(Continued)

*Primary Examiner* — Michael P LaPage
(74) *Attorney, Agent, or Firm* — Harrington & Smith

(57) ABSTRACT

An apparatus comprising: a void; an interferometer detector; and
light guide means for guiding a light signal along a light path to the interferometer detector wherein the light path comprises a cantilever light guide that is supported such that a free-end can move within the void and the interferometer detector is configured to detect a deflection of the free-end of the cantilever light guide; and
a reflector, wherein the cantilever light guide comprises a light outcoupler configured to out-couple the light signal to extend the light path from the cantilever light guide to the reflector.

16 Claims, 7 Drawing Sheets

(56) References Cited

U.S. PATENT DOCUMENTS

| | | | | |
|---|---|---|---|---|
| 5,394,741 | A * | 3/1995 | Kajimura | G01Q 20/02 850/22 |
| 5,420,688 | A * | 5/1995 | Farah | G01P 15/093 250/227.27 |
| 6,046,448 | A * | 4/2000 | Sato | G01Q 20/02 850/37 |
| 6,252,307 | B1 * | 6/2001 | Appelt | B82Y 30/00 257/784 |
| 6,388,239 | B1 * | 5/2002 | Muramatsu | G01Q 60/38 250/201.3 |
| 6,525,307 | B1 | 2/2003 | Evans, III et al. | |
| 8,194,246 | B2 | 6/2012 | Thundat et al. | |
| 9,243,998 | B2 | 1/2016 | Avramescu et al. | |
| 11,016,119 | B1 * | 5/2021 | Ukhanov | G01Q 70/14 |
| 2001/0011704 | A1 * | 8/2001 | Niwa | B82Y 20/00 850/30 |
| 2005/0180678 | A1 * | 8/2005 | Panepucci | G01D 5/268 385/13 |
| 2007/0234786 | A1 * | 10/2007 | Moon | G03F 9/7038 356/501 |
| 2008/0073520 | A1 * | 3/2008 | Givargizov | G01Q 60/22 250/306 |
| 2011/0170108 | A1 * | 7/2011 | Degertekin | G01Q 60/38 356/454 |
| 2014/0047585 | A1 * | 2/2014 | Hofrichter | G01Q 60/38 850/56 |
| 2014/0368829 | A1 * | 12/2014 | Dell | G01N 29/036 356/480 |
| 2015/0131106 | A1 | 5/2015 | Pruessner et al. | |
| 2016/0047781 | A1 | 2/2016 | Koley | |
| 2016/0202288 | A1 * | 7/2016 | Erickson | G01Q 60/24 850/40 |
| 2018/0172728 | A1 | 6/2018 | Aksyuk et al. | |
| 2018/0210009 | A1 | 7/2018 | Aksyuk et al. | |

FOREIGN PATENT DOCUMENTS

| | | | | |
|---|---|---|---|---|
| JP | H04131710 | * | 6/1992 | ............ G01B 11/30 |
| TW | I642939 B | | 12/2018 | |
| WO | WO-2004/112050 A1 | | 12/2004 | |

OTHER PUBLICATIONS

Bain et al., "Miniaturisation and Integration of a Cantilever based Photoacoustic Sensor into Micro Micromachined Device", The Electrochemical Society Meeting Abstracts, J1—Sensors, Actuators, and Microsystems General Session, vol. MA2011-02, 2011, 1 page.

Ledermann et al., "Piezoelectric Pb(Zrx, Ti1-X)O3 Thin Film Cantilever and Bridge Acoustic Sensors for Miniaturized Photoacoustic Gas Detectors", Journal of Micromechanics and Microengineering, vol. 14, No. 12, Aug. 26, 2004, pp. 1650-1658.

Fonsen et al., "Dual Cantilever Enhanced Photoacoustic Detector with Pulsed Broadband IR-Source", Vibrational Spectroscopy, vol. 50, No. 2, Jul. 20, 2009, pp. 214-217.

Ghaderi et al., "Interferometric-Displacement Readout of Cantilever Sensors", Proceedings of SPIE—The International Society for Optical Engineering, vol. 8430, 2012, 6 pages.

Koev et al., "A Cantilever Sensor with an Integrated Optical Readout for Detection of Enzymatically Produced Homocysteine", IEEE Transactions on Biomedical Circuits and Systems, Cvol. 3, No. 6, Dec. 2009, pp. 415-423.

Liu et al., "A Cantilever Based Optical Fiber Acoustic Sensor Fabricated by Femtosecond Laser Micromachining", Laser 3D Manufacturing III, Apr. 2016, 7 pages.

Lulec et al., "Simultaneous Selfsu-Stained Actuation and Parallel Readout with Mems Cantilever Sensor Array", IEEE 25th International Conference on Micro Electro Mechanical Systems (MEMS), Jan. 29-Feb. 2, 2012, pp. 644-647.

Extended European Search Report received for corresponding European Patent Application No. 19167851.5, dated Oct. 1, 2019, 8 pages.

* cited by examiner

APPARATUS WITH CANTILEVER LIGHT GUIDE

TECHNOLOGICAL FIELD

Embodiments of the present disclosure relate to an apparatus comprising a cantilever. Some embodiments relate to detecting a deflection of a free-end of the cantilever.

BACKGROUND

Cantilevers are used for a wide variety of sensing applications including, for example, atomic force microscopy, microscale chemical sensing, accelerometry and acoustic sensing.

In some examples, very small deflections of a cantilever need to be detected or measured.

BRIEF SUMMARY

According to various, but not necessarily all, embodiments there is provided an apparatus comprising:
a void;
a reflector
an interferometer detector; and
light guide means, for guiding a light signal along a light path to the interferometer detector,
comprising a cantilever light guide for guiding the light signal along a portion of the light path to the reflector, wherein the cantilever light guide is supported such that a free-end of the cantilever light guide can move within the void;
wherein the cantilever light guide comprises a light outcoupler configured to out-couple the light signal to extend the light path from the cantilever light guide to the reflector and wherein the interferometer detector is configured to detect a deflection of the free-end of the cantilever light guide based at least in part on the out-coupled light signal after reflection by the reflector.

According to various, but not necessarily all, embodiments there is provided an apparatus comprising: a void; an interferometer detector; and light guide means for guiding a light signal along a light path to the interferometer detector wherein the light path comprises a cantilever light guide that is supported such that a free-end can move within the void and the interferometer detector is configured to detect a deflection of the free-end of the cantilever light guide; and a reflector, wherein the cantilever light guide comprises a light outcoupler configured to out-couple the light signal to extend the light path from the cantilever light guide to the reflector.

In some but not necessarily all examples, the light outcoupler comprises periodic diffraction elements.

In some but not necessarily all examples, the reflector is a plane reflector that is substantially parallel to the cantilever light guide when the cantilever light guide is at rest. At rest means that it's displacement is not changing. It has no velocity or acceleration.

In some but not necessarily all examples, the cantilever light guide in an integral component of a first substrate and the reflector is an integral component of a second substrate adjacent the first substrate.

In some but not necessarily all examples, the optical signal is split such that the optical signal travels along a first light path to the interferometer detector via the cantilever light guide and simultaneously travels along a second different light path to the interferometer detector, wherein the interferometer detector detects a change in a length of the first light path compared to the second light path. The first light path is a first branch of the light path. The second light path is a second different branch of the light path.

In some but not necessarily all examples, the interferometer detector is calibrated to measure a deflection of the cantilever light guide.

In some but not necessarily all examples, the interferometer detector comprises one or more phase shifters for calibrating the interferometer detector.

In some but not necessarily all examples, the light path has an outward portion comprising the cantilever light guide and a return portion comprising the cantilever light guide.

In some but not necessarily all examples, the light path has an outward portion comprising the cantilever light guide and a parallel portion not comprising the cantilever light guide.

In some but not necessarily all examples, the outward portion comprising the cantilever light guide and the parallel portion each have balanced detectors.

In some but not necessarily all examples, the outward portion comprising the cantilever light guide further comprises an additional cantilever light guide, wherein light from the cantilever light guide travels into the additional cantilever light guide.

In some but not necessarily all examples, the cantilever light guide and the interferometer detector are formed from a single monolithic substrate.

In some but not necessarily all examples, the apparatus, further comprises an additional monolithic substrate defining a reflector, wherein the cantilever light guide comprises a light outcoupler configured to out-couple the light signal to extend the light path from the cantilever light guide to the reflector.

In some but not necessarily all examples, the additional monolithic substrate comprises an excitation radiation source for generating a photoacoustic signal from a sample in the void.

In some but not necessarily all examples, the apparatus is part of a sensing system configured for atomic force microscopy, microscale chemical sensing, accelerometry or acoustic sensing.

According to various, but not necessarily all, embodiments there is provided examples as claimed in the appended claims.

BRIEF DESCRIPTION

Some example embodiments will now be described with reference to the accompanying drawings in which:

FIG. 1A schematically illustrates an example of an apparatus comprising a cantilever light guide;

Figure 5:
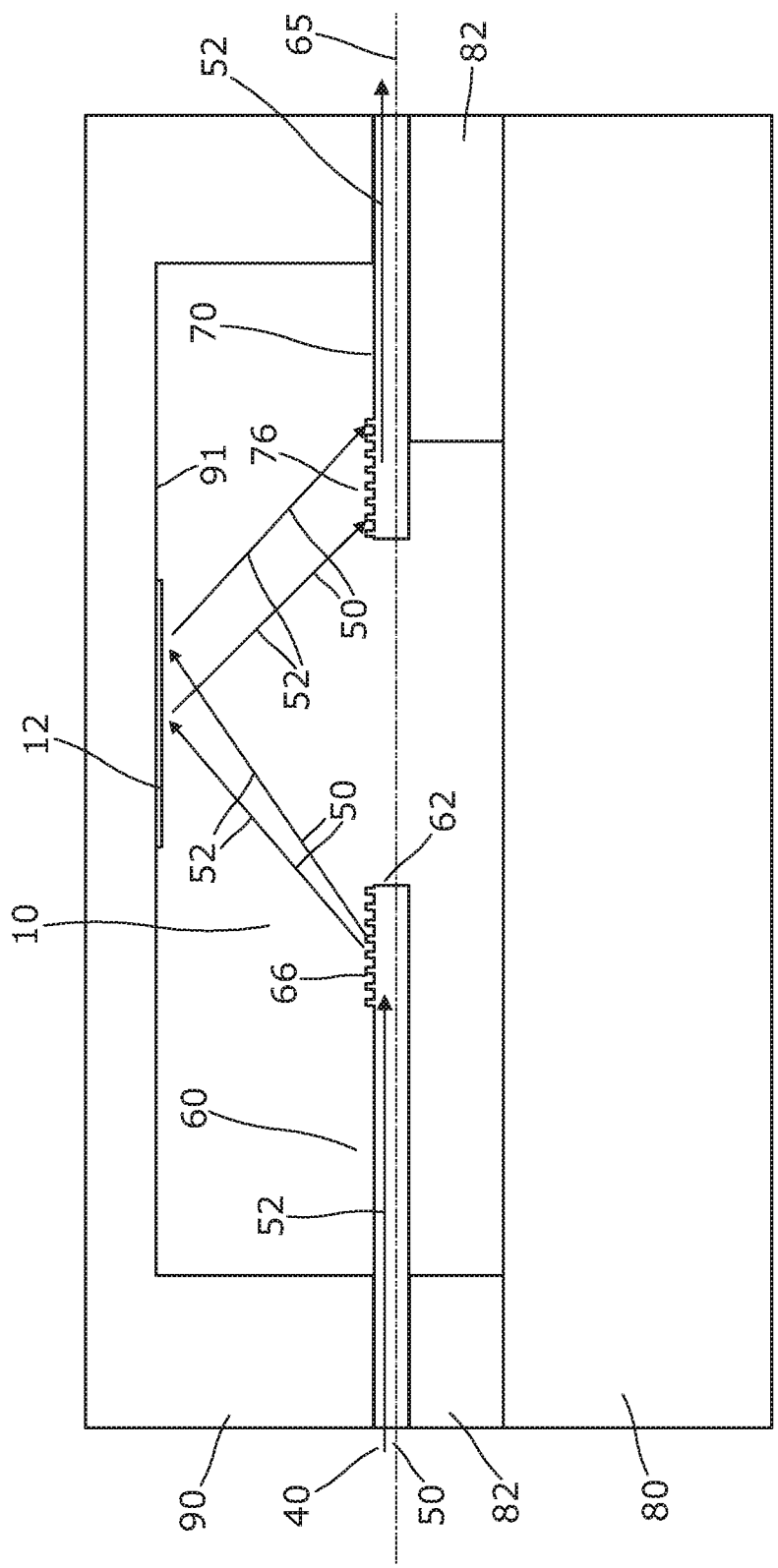
Figure 6A:
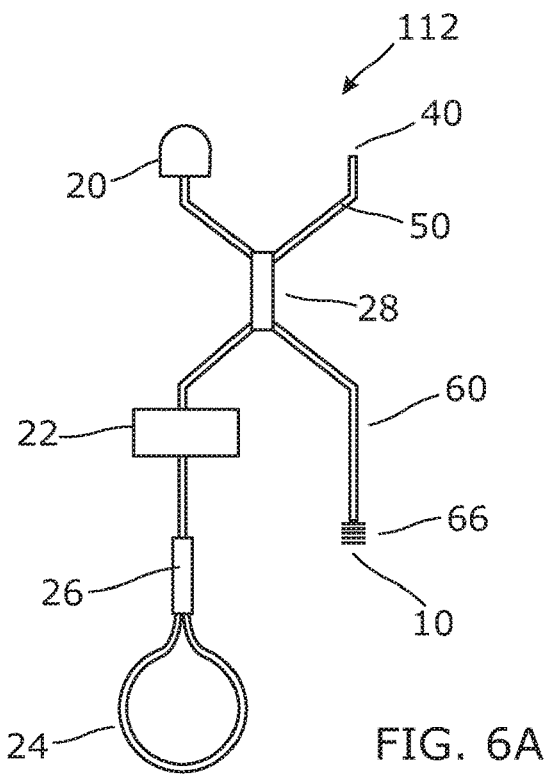
Figure 6B:
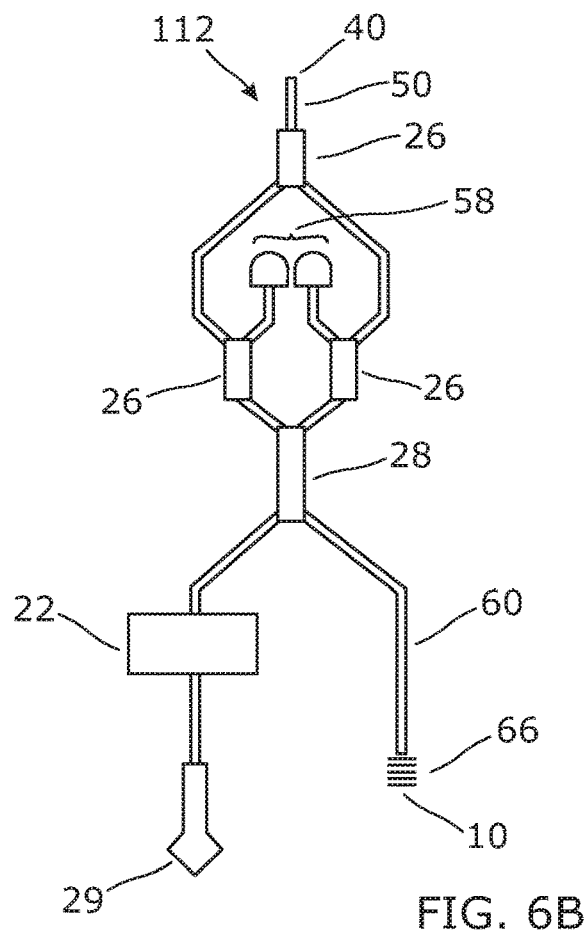
Figure 6C:
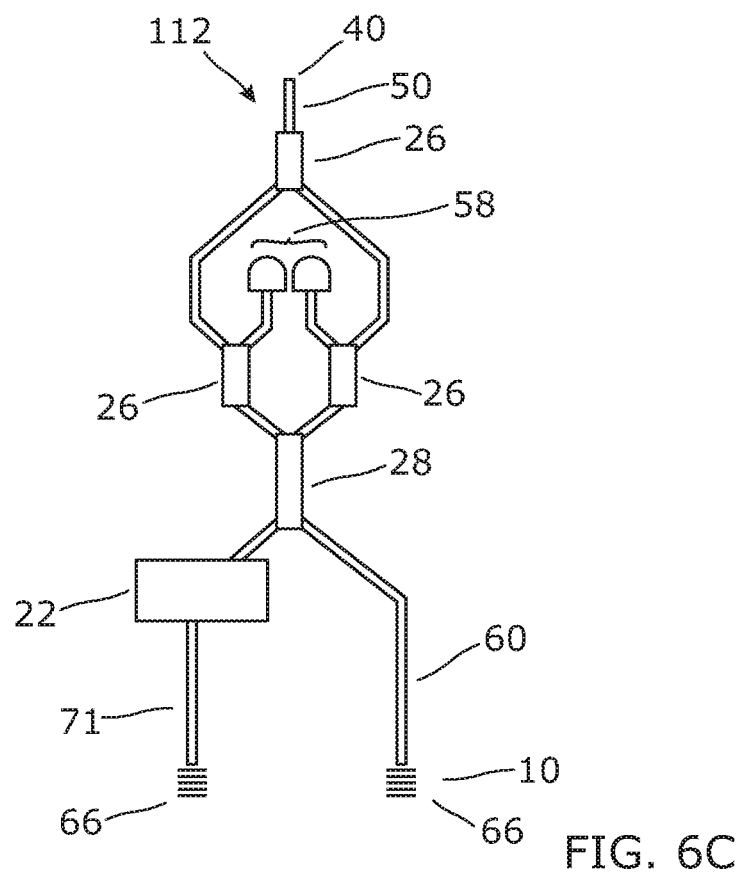
Figure 7:
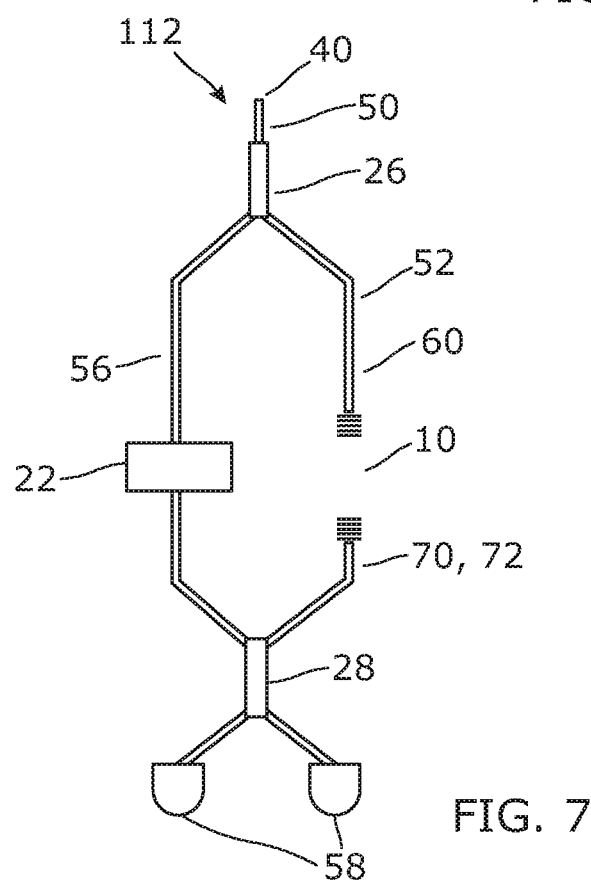
Figure 8:
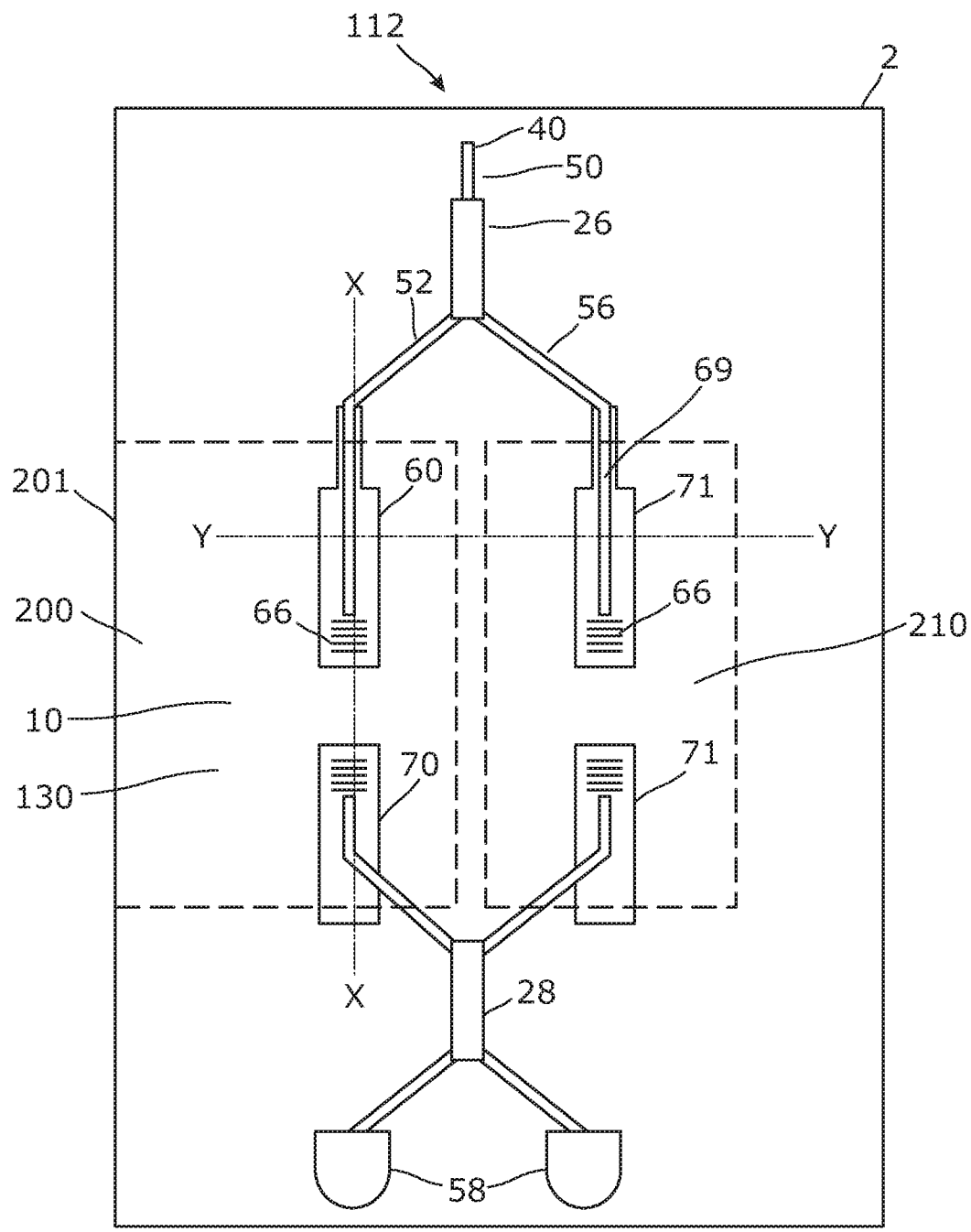
Figure 9:
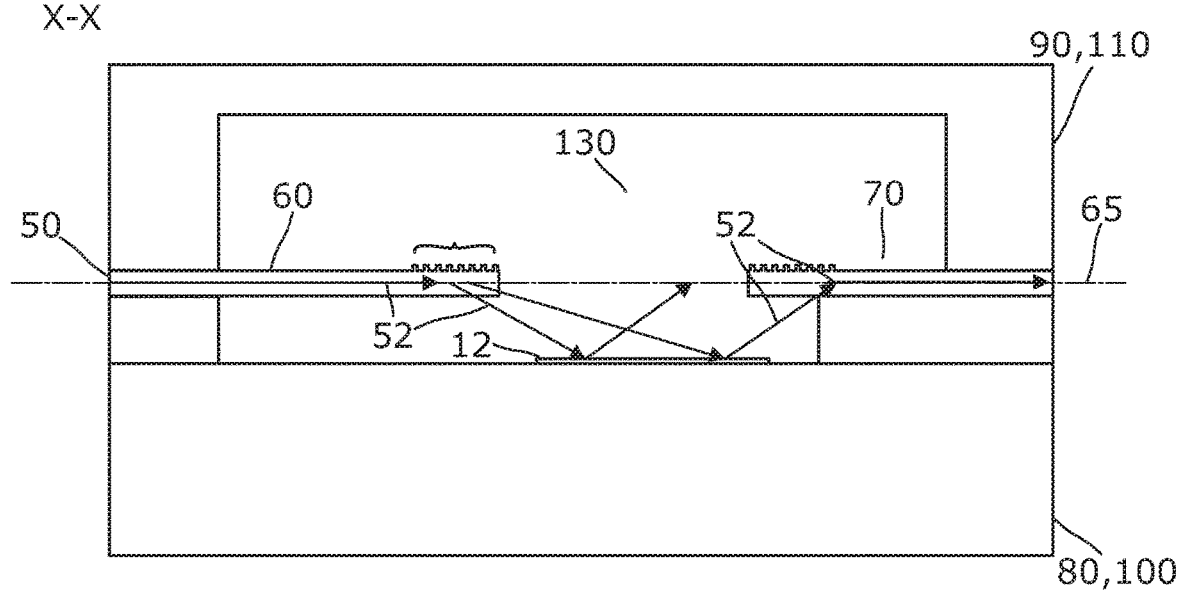
Figure 9:
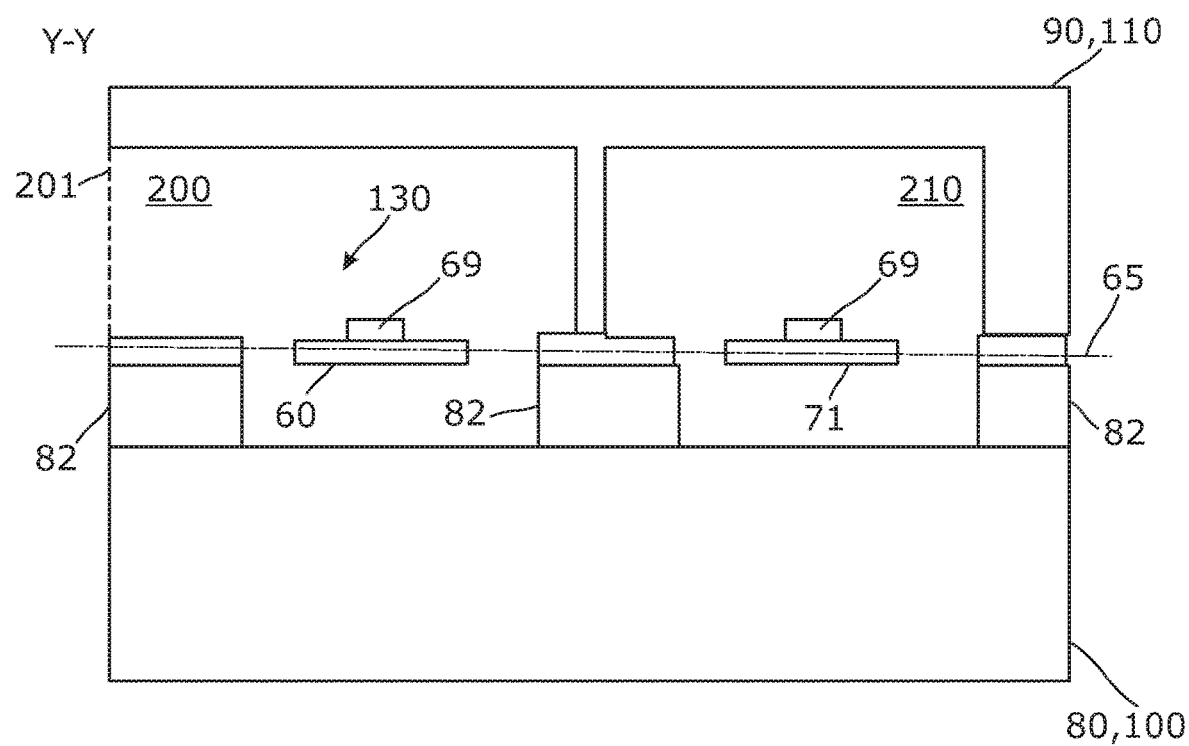

FIG. 5. Illustrates a further example of the apparatus comprising a first substrate for a cantilever light guide and an additional cantilever light guide, and a second substrate for a reflector;

FIG. 6A illustrates an example of an interferometer detector;

FIG. 6B illustrates a further example of an interferometer detector;

FIG. 6C illustrates a further example of an interferometer detector;

FIG. 7 illustrates a further example of an interferometer detector;

FIG. 8 illustrates an example plan view of the apparatus comprising open and closed cavities; and FIG. 9 illustrates cross-sections X-X and Y-Y of FIG. 8.

DETAILED DESCRIPTION

According to various examples described below there is provided an apparatus 2 comprising: a void 10; an interferometer detector 20; and light guide means 30 for guiding a light signal 40 along a light path 50 to the interferometer detector 20 wherein the light path 50 comprises a cantilever light guide 60 that is supported such that a free-end 62 can move within the void 10 and the interferometer detector 20 is configured to detect a deflection of the free-end 62 of the cantilever light guide 60. In some examples, the apparatus 2 comprises a reflector 12, and the cantilever light guide 60 comprises a light outcoupler 66 configured to out-couple the light signal 40 to extend the light path 50 from the cantilever light guide 60 to the reflector 12.

Figure 1A:
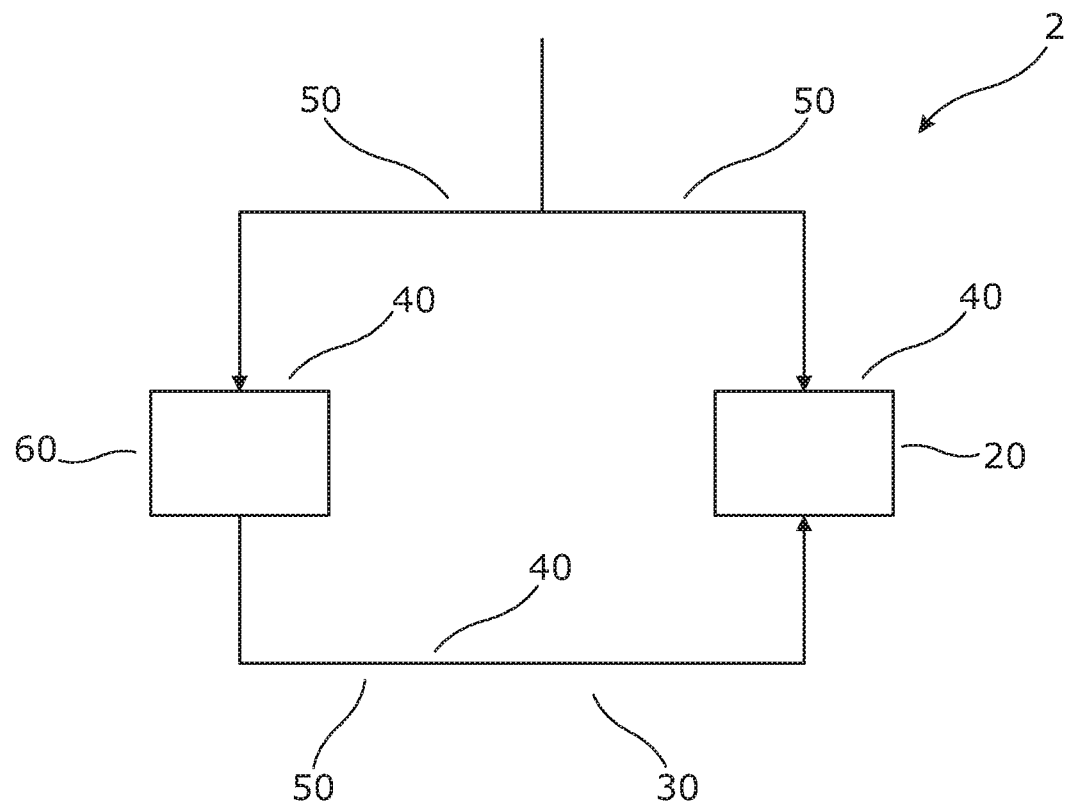
FIG. 1B illustrates an example of a cantilever light guide.

FIG. 1A provides a schematic example of an apparatus 2. The apparatus 2 comprises cantilever light guide 60 and an interferometer detector 20 configured to detect a deflection of the cantilever light guide 60.

Light guide means 30 is for guiding a light signal 40 along a light path 50. The light path 50 provides two routes for the light signal 40 to the interferometer detector 20. A first route comprises the cantilever light guide 60, the other second route does not. The first route is via (through) the cantilever light guide 60.

Figure 1B:
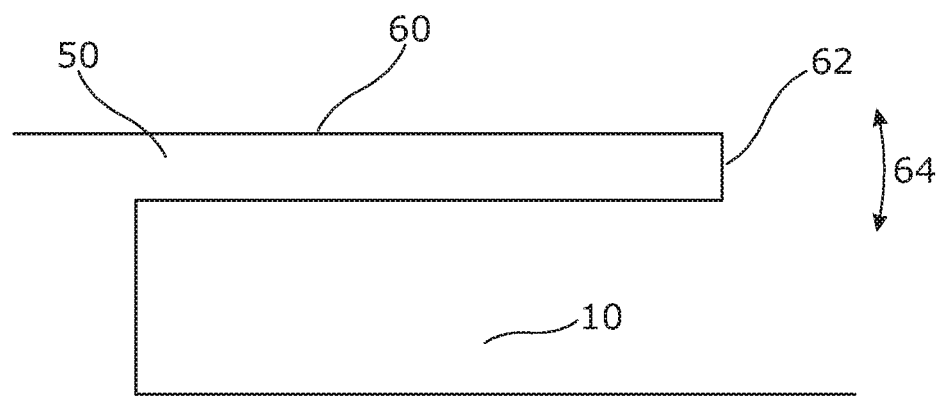

Referring now to FIG. 1B, the cantilever light guide 60 as described in FIG. 1A is supported such that a free end 62 of the cantilever light guide 60 can move within a void 10. Deflection 64 of the free end 62 of the cantilever light guide 60 alters the light path 50 to the interferometer detector 20 via (through) the cantilever light guide 60. This generates a phase change in the light signal 40 that is received at the interferometer detector 60 via the cantilever light guide 60. The interferometer detector 60 detects the phase change and thereby detects a deflection of the free-end 62 of the cantilever light guide 60.

The cantilever light guide 60 is elongate in that it is much longer than it is wide or deep. The light signal 40 travelling within the cantilever light guide 60 is guided by total internal reflection.

In some but not necessarily all examples, the cantilever light guide 60 is a microscale cantilever. In some but not necessarily all examples, the cantilever is formed from a substrate, for example, a semiconductor substrate such as a silicon substrate.

In some but not necessarily all examples, the cantilever is formed from a dielectric, such as an oxide. In some but not necessarily all examples, the cantilever and substrate are formed from the same material.

Figure 2:
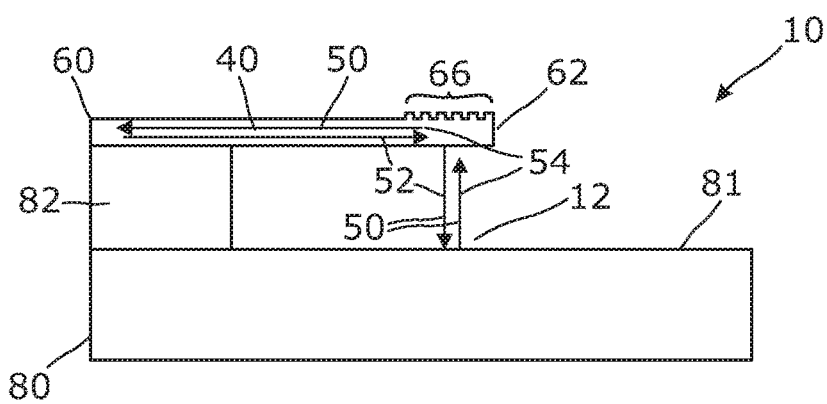
FIG. 2 illustrates an example of an apparatus comprising a cantilever light guide.

FIG. 2, 3, 4, 5 illustrates different examples where the apparatus 2, as previously described, comprises a reflector 12, and the cantilever light guide 60 comprises a light outcoupler 66 configured to out-couple the light signal 40 to extend the light path 50 from the cantilever light guide 60 to the reflector 12.

The outcoupler 66 outcouples the light signal 40 from the surface of the cantilever light guide 60. The light outcoupler 66 can include periodic diffraction elements, having a periodicity, a. The periodicity a is chosen to control the angle of the light path 50 from the cantilever light guide 60, whilst producing a limited divergence of the light signal 40. This divergence can, in some examples, be approximately 10 degrees.

Alternative means for outcoupling the light signal from the surface of the cantilever light guide 60 are possible. These include the use of prisms or microprisms on the surface of the cantilever light guide 60.

Whichever means is used, the light outcoupler 66 is typically located at or near the free-end 62 of the cantilever light guide 60. This is so that the light signal 40 which travels via the cantilever light guide 60 leaves the cantilever light guide 60 where the deflection of the cantilever light guide 60 is greater. This increases the phase difference between the light signal 40 which has travelled via the cantilever light guide 60 and the light signal 40 which has not travelled via the cantilever light guide 60, for a given deflection of the free end 62. This improves sensitivity of the detection apparatus 2.

In some examples, the light outcoupler 66 is at the free-end 62 of the cantilever light guide 60, and deflection of the free-end 64 of the cantilever light guide 60 is measured. In this context measurement is different to detection. Detection determines whether or not a deflection has occurred and measurement determines or estimates a quantum of the deflection.

The particular example apparatuses 2 illustrated in FIGS. 2, 3, 4 & 5 comprise a first substrate 80, an oxide layer 82. The oxide layer 82 is between the cantilever light guide 60 and the first substrate 80 and locates the cantilever light guide 60 so that its free end 62 has space to deflect within a void 10. The reflector 12 can be a plane reflector that is parallel to the cantilever light guide 60. The light outcoupler 66 is configured to out-couple the light signal 40 to extend the light path 50 from the cantilever light guide 60 to the reflector 12.

Figure 3:
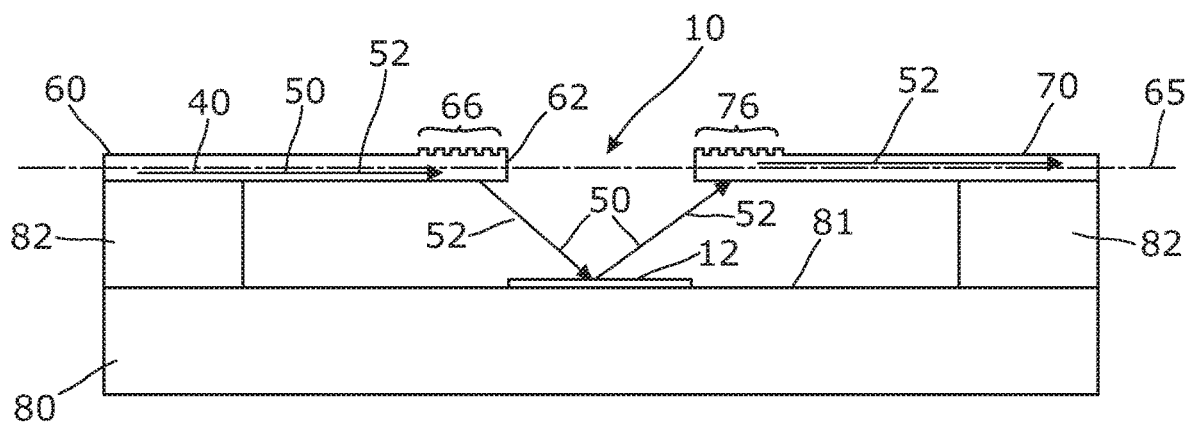
FIG. 3 illustrates a further example of an apparatus comprising a cantilever light guide and an additional cantilever light guide.

In FIGS. 2 & 3, the reflector 12 can be on or integrated with a surface 81 of the first substrate 80. The reflector 12 can be a plane reflector that is parallel to the cantilever light guide 60.

Figure 4:
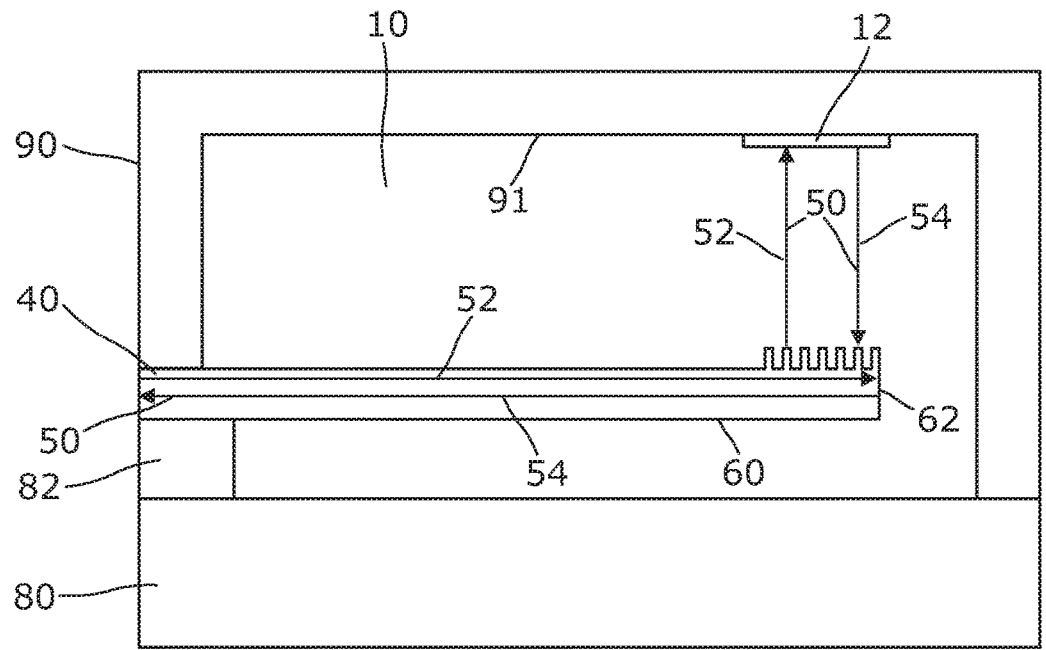
FIG. 4 illustrates an example of an apparatus comprising a first substrate for the cantilever light guide and a second substrate for a reflector.

In FIGS. 4 & 5, the reflector 12 can be on or integrated with a surface 91 of a second substrate 90 which is adjacent to the first substrate 80. The reflector 12 can be a plane reflector that is parallel to the cantilever light guide 60. The cantilever light guide 60 is an integral component of a first substrate 80 and the reflector 12 is an integral component of a second substrate 90 which is adjacent to the first substrate 80. The first substrate 80 and the second substrate 90 together define the void 10 in which the cantilever light guide 60 moves.

The second substrate 90 can be made from different materials to the first substrate 80. In particular, oxides or polymers such as SU-8 can be used.

The location of the light outcoupler 66 on the cantilever light guide 60 in FIGS. 4 & 5 can be different to FIGS. 2 and 3 in that the light outcoupler 66 is configured to out-couple the light signal 40 to extend the light path from the cantilever light guide to a reflector mounted on or integrated with the surface of the second substrate 90. In FIGS. 4 and 5, the light outcoupler is on the upper surface 67 of the cantilever light guide 60, whereas in FIGS. 2 and 3 it is on the lower surface 69. Other locations are possible, subject to the relative geometry of the first and second substrates 80, 90.

In FIGS. 2 & 4, the light outcoupler 66 is configured so that the light path 40 is substantially or significantly perpendicular to the elongate direction of the cantilever light guide 60. Other angles are possible.

When the light signal 40 leaves the light out-coupler 66 of the cantilever light guide 60, it travels through the void 10 until it reaches the reflector 12 whereupon it is reflected back towards the cantilever light guide 60.

Once the light signal 40 has reached the cantilever light guide 60 it is in-coupled to the cantilever light guide 60 via the light coupler 66 (now operating as an in-coupler rather than an out-coupler). The light signal 40 travels via the cantilever light guide 60 to the interferometer detector 20 along a return path. Thus, the light path 50 includes an outward portion 52 and a return portion 54, where both the outward portion 52 and the return portion 54 travel through the cantilever light guide 60.

FIGS. 3 & 5 illustrate examples of the apparatus 2 comprising an additional cantilever light guide 70. The additional cantilever light guide 70 can be made from the same material as the cantilever light guide 60. Alternatively, different materials can be used. The additional cantilever light guide 70 can have the same dimensions as the cantilever light guide 60. Alternatively, the dimensions of the cantilever light guide 60 and additional cantilever light guide 70 can be different. The cantilever light guide 60 and the additional cantilever light guide 70 can be in the same plane 65.

The additional cantilever light guide 70 comprises a coupling element 76, similar to the light out-coupler 66 of the cantilever light guide 60. However, it is used to in-couple light that is output by the light out-coupler 66 and reflected by the reflector 12.

In the examples illustrated, the cantilever light guide 60 and the additional cantilever light guide 70 are mounted on an oxide layer 82 on a first substrate 80.

In the examples of FIGS. 3 & 5, the outward portion 52 of the light path 50 comprising the cantilever light guide 60 also comprises the additional cantilever light guide 70. The light signal 40 guided along the light path 50 travels via (through) the cantilever light guide 60 to the light outcoupler 66. The light outcoupler 66 extends the light path 50 from the cantilever light guide 60 to the reflector 12 where the light signal 40 is reflected and travels into the additional cantilever light guide 70. Once the light signal 40 reaches the additional cantilever 70 it travels within it, guided by total internal reflection, towards the interferometer detector 20.

In these examples, the periodicity of the diffraction grating used by the light outcoupler 66 can be different to the example of FIG. 2 so that the light path 50 leaving the cantilever light guide 60 is not substantially or significantly perpendicular to a plane of the cantilever light guide 60. In other words, the light path 50 leaving the cantilever light guide 60 is not substantially or significantly perpendicular to the plane 65.

A change to a length of the light path 50 is caused by deflection of the cantilever light guide 60 and also by deflection of the additional cantilever 70. In some examples, the cantilever light guide 60 and the additional cantilever light guide 70 may be designed to move in phase. This maximizes the change in light path length caused by movement up/down of the cantilever free ends. In some examples, the cantilever light guide 60 and the additional cantilever light guide 70 may be designed to have the same mechanical response, for example the same moment of inertia and stiffness. In other some examples, the cantilever light guide 60 and the additional cantilever light guide 70 may be designed to have different mechanical responses.

In cases where the cantilever light guide 60 vibrates, the additional cantilever 70 can be configured so that it vibrates with the same frequency as the cantilever light guide 60.

Alternatively, the additional cantilever 70 can be replaced by a fixed (non-moving) waveguide 72.

Interferometer Detectors

Different interferometer detectors 20 can be used. The choice of interferometer detector can be influenced by the configuration of cantilever light guide 60. For example, by whether there is a return portion 54 of the light path 50 via the cantilever light guide 60 or whether the cantilever light guide 60 only acts as a light guide means 30 for an outward portion 52 of the light path 50.

Light guide means 30 is for guiding a light signal 40 along a light path 50. The light path 50 provides two routes for the light signal 40 to the interferometer detector 20. A first route comprises the cantilever light guide 60, the other second route does not. The first route is via (through) the cantilever light guide 60. The light signal 40 is split into two and recombined. The light signal 40 travels along a first light path 50 to the interferometer detector 20 via the cantilever light guide 60 and simultaneously travels along a second different light path 50 to the interferometer detector 20. The interferometer detector 20 detects (or measures) a change in length of the first light path 50 compared to the second light path 50.

The interferometer detector 20 is calibrated to measure at least a deflection 64 of the free end 62 of the cantilever light guide 60. This is done by equating the change in length of the first light path via the cantilever light guide 60 to the deflection of the free end 64 of the cantilever light guide 60.

It can be desirable to calibrate the interferometer detector 20 such that the interferometer detector 20 has a known output when there is zero deflection of the free end 64 of the cantilever light guide 60. The known output can be zero when there is zero deflection of cantilever light guide 60.

As there are multiple sources of potential variation, including manufacturing tolerances, it is desirable to be able to individually adjust the zero calibration of each manufactured apparatus. This can be done by incorporating one or more phase shifters 22 for calibrating the interferometer detector 20. These phase shifters 22 can be incorporated within the interferometer detector 20 or alternatively, can be incorporated within the light path 50 going to the interferometer detector 20. These, or additional phase shifters 22 in other parts of the light path 50, can also be used as part of the phase detection means.

Different types of interferometer detector 20 may be used, although all types have common features.

The example interferometer detectors 20 of FIGS. 6A, 6B, 6C and 7 are similar in that they work by splitting a light signal 40 into two routes. A first route for the first light path comprises the cantilever light guide 60, while a second route for the second light path does not. The second route/light path that does not comprise the cantilever light guide 60 is used as a reference. The light of the first light path is recombined with the light of the second light path to detect and, optionally, measure a phase difference between the light signals 40 travelling via the two routes.

In the examples illustrated, but not necessarily all examples, the interferometer detectors 20 of FIGS. 6A, 6B, 6C and 7 each comprise at least one phase shifter 22.

The interferometer detectors 20 of FIGS. 6A, 6B and 6C are similar to each other, but different to FIG. 7 in that in FIGS. 6A, 6B and 6C the first light path 50 via (through) the cantilever light guide 60 has an outward portion 52 and a return portion 54 comprising the cantilever light guide 60. In comparison, in FIG. 7, the first light path 50 via the cantilever light guide 60 comprises an outward portion comprising the cantilever light guide 60, but does not have a return portion 54 via the cantilever light guide 60. In other words, in FIGS. 6A, 6B and 6C, the first light path 60 via (through) the cantilever light guide 60 is bi-directional, whereas in FIG. 7, the first light path 50 via the cantilever light guide 60 is uni-directional.

FIGS. 6A to 6C illustrate examples of an interferometer detector 20. The interferometer detector 20 is a Michelson interferometer. This interferometer detector 20 is suitable for use when the first light path 50, along the first route, has an outward portion 52 comprising the cantilever light guide 60 and a return portion comprising the cantilever light guide 60. It can be used with the examples illustrated in FIGS. 2 & 4.

The interferometer detectors 20 illustrated in FIGS. 6A to 6C differ in that the second (reference) route that does not include the cantilever light guide 60 is different.

In FIG. 6A, 6B, 6C, light guide means 30 provides two routes for the light signal 40 to the interferometer detector 20. A first route comprises the cantilever light guide 60, the other second route does not. The first route is via (through) the cantilever light guide 60. A 2×2 coupler 28 is used to split the light signal 40 into two such that the light signal 40 travels along a first route/light path to the interferometer detector 20 via the cantilever light guide 60 and simultaneously travels along a second different route/light path to the interferometer detector 20. The light path 50, along the first route, has an outward portion 52 comprising the cantilever light guide 60 and a return portion 54 comprising the cantilever light guide 60. The second light path, along the second route, also has an outward portion and a return portion. The return portions of the light paths from the first and second routes are combined by the 2×2 coupler. One or both routes can comprise a phase shifter 22.

In FIG. 6A, the 2×2 coupler 28 has two ports coupled to the input light signal 40 and the detector 20, respectively and two ports coupled to the first and second routes. The return portions of the light paths from the first and second routes are combined by the 2×2 coupler 28 and provided to the detector 20. The second route comprises a 1×2 coupler 26 that couples to a loop reflector 24. The 1×2 and 2×2 couplers can allow bi-directional coupling.

In FIGS. 6B and 6C, the single detector 20 of FIG. 6A is replaced by a pair of balanced detectors 58, wherein each balanced detector 58 receives a light signal 40 via one 1×2 coupler 26.

The light signal 40 from the excitation radiation source 112 is split by a 1×2 coupler 26 into two routes. Each of these routes is linked by a separate 1×2 coupler 26 to the 2×2 coupler 28.

Light from both return routes is recombined at the 2×2 coupler 28 before being provided via the 1×2 couplers 26 to the balanced detectors 58.

At least one phase shifter 22 can be adjusted to equalize the phases so that the output of the balanced detectors 58 is zero for the central position of the cantilever light guide 60. This maximizes the dynamic range of the detection. By measuring the degree of phase shift applied to the phase shifter 22, the deflection of the free end 62 of the cantilever light guide 60 can be detected (or measured).

In FIG. 6B, the 1×2 coupler and loop reflector of FIG. 6A are additionally replaced by a detection reflector 29 in the second reference route.

In FIG. 6C, the 1×2 coupler and loop reflector of FIG. 6A are additionally replaced by a reference cantilever light guide 71 that is the same or similar to the cantilever light guide 60 that has been described previously. This reference cantilever light guide 71 is configured to not move when the cantilever light guide 60 moves.

Other forms of interferometer detector 20 can be used. FIG. 7 illustrates another example of an interferometer detector 20 (Mach Zehnder Interferometer). The Mach Zehnder Interferometer can be used when the first light path 50 has a uni-directional outward portion 52 comprising the cantilever light guide 60 and a parallel portion 56 not comprising the cantilever light guide 60.

In contrast to the Michelson Interferometer, the light paths are uni-directional. In other words, the Mach Zehnder Interferometer can be used with the example cantilever configurations shown in FIG. 3 and/or FIG. 5. The return path 54 of the light guide 50 does not travel via (through) the cantilever light guide 60.

In this example, a 1×2 coupler 26 is used to split the light signal 40 into a reference light signal, known as a parallel portion 56, and a detection light signal 40 which travels via the cantilever light guide 60 across the light outcoupler 66. The two light signals 40 are combined using a 2×2 coupler 28 with balanced detectors 58 used for phase difference measurement between the reference signal and the detection light signal 40. Other types of interferometer detector 20 configurations can be implemented. These include, but are not limited to a 2×1 coupler with a single detector and/or a 2×4 90° hybrid.

The outward portion 52 comprising the cantilever light guide 60 and the parallel portion 56 each have balanced detectors.

As in previous examples, the apparatus 2 can include at least one phase shifter 22. The at least one phase shifter 56 can be placed in either the parallel portion 56 or outward portion 52 of the cantilever light guide 60. The at least one phase shifter 22 can be adjusted to equalize the phases for zero displacement of the cantilever light guide 60. The output of the balanced detectors 58 is therefore zero for the central (no-deflection) position of the cantilever light guide 60. This maximizes the dynamic range of the detection.

FIG. 8 illustrates an example of an interferometer detector 20 similar to that described with reference to FIG. 7. In this example, the parallel portion 56 and the outward portion 52 each include a pair of additional cantilever light guides 70,71. In other words, the parallel portion 56 and the outward portion 52 can be configured as shown in FIGS. 3 and/or 5. The cantilevers 71 in the parallel portion 56 are isolated from vibrations moving the cantilever light guide 60 or are subjected to different vibrations to the cantilever light guides 60, 70 of the first light path.

The cantilever light guides can have the same dimensions and can be made from the same material, such as silicon. Alternatively, the cantilevers can have different dimensions and be made from different materials.

In any of the previous examples, deflection 64 of the free end 62 of the cantilever light guide 60 can be caused by acoustic pressure waves within the void 10. The acoustic pressure waves can be generated by a sample in the void 10 as a result of the photoacoustic effect. The photoacoustic effect causes the formation of acoustic pressure waves following radiation absorption in a material sample. The radiation can be produced by an excitation radiation source 112 such as a photodiode or laser.

FIGS. 8 and 9 illustrate an example of how a cantilever light guide 60 for the first light path can be located within an open acoustic cavity 200 comprising the void 10 and that the parallel portion 56 for the second light path 50, not comprising the cantilever light guide 60, is located within a closed acoustic cavity 210. The open acoustic cavity 200 and closed acoustic cavity 210 can be adjacent. FIG. 8 shows a plan view of the configuration, while FIG. 9 shows cross-sections X-X and Y-Y of FIG. 8.

FIG. 8 is marked to show the reference planes X-X and Y-Y of FIG. 9. Plane X-X is substantially parallel to the elongate direction of the cantilever light guide 60. Plane Y-Y is substantially perpendicular to plane X-X. Both planes X-X and Y-Y intersect the cantilever light guide 60.

Although FIGS. 8 and 9 illustrate an example of the cantilever light guide 60 arrangement as illustrated in FIG. 3, it can be appreciated that the cavities disclosed by FIGS. 8 and 9 can alternatively house the cantilever light guide 60 arrangements of FIGS. 2, 4 and 5.

The open acoustic cavity 200 comprises the sample 130, and also a cantilever light guide 60 as previously described. The acoustic pressure waves produced by the sample 130 because of the photoaccoustic effect cause a deflection to the cantilever light guide 60. The deflection of the cantilever light guide 60 is detected (or measured) using the interferometer detector 20 as previously described. The apparatus is therefore able to detect the presence and/or identify the sample 130.

The open acoustic cavity 200 and closed acoustic cavity 210 can be formed from a first substrate 80 and a second substrate 90. The first substrate 80 and the second substrate 90 are adjacent. The second substrate 90, which may be a monolithic substrate 110 can comprise the excitation radiation source for causing the photoacoustic effect.

It can be appreciated that FIGS. 8 and 9 show one example embodiment. Other embodiments are also possible. For example, the closed acoustic cavity 210 comprising the reference cantilever light guide 71 can be replaced by a continuous light guide means 30 such as an optical fiber.

In any of the previous examples, the cantilever light guide 60 and the interferometer detector can be formed using a single monolithic substrate 100. The single monolithic substrate 100 can be the first substrate 80. In some examples, the apparatus can further comprise an additional second monolithic substrate 90, 110, defining the reflector 12.

Construction

The apparatus of FIGS. 2, 3, 4 and 5 can be constructed in a similar manner.

As the light signal 40, comprising the cantilever light guide 60 mostly propagates in the plane of the cantilever lightguide 60, it is convenient to fabricate the apparatus 2 using a Silicon-on-Insulator (SOI) platform. Referring back to FIGS. 2, 3, 4, 5, 9, the SOI platform can comprise a buried insulating layer that is positioned between two silicon layers. After suitable etching of the SOI platform, one silicon layer provides the first substrate 80, another silicon layer provides the cantilever light guide 60 and the insulating layer provides the oxide layer 82. The SOI platform is an example of a single monolithic substrate 100.

The top layer can be made of silicon and can be used to fabricate optical wave guides. The at least one cantilever light guide 60, additional cantilever light guide 70 and/or fixed waveguide 72 can be part of this top layer.

The cantilever light guide 60 and the interferometer detector 20 can be formed using a single monolithic substrate 80, 100. These can be formed in the same layer of the SOI wafer. The single monolithic substrate 100 can be made of silicon. Additional monolithic substrates 90, 110 can also be used to define reflectors and closed cavities. For example, FIG. 9 illustrates an example comprising a single monolithic substrate 100 and an additional monolithic substrate 110. The additional monolithic substrate 110 can define a reflector 12, wherein the cantilever light guide 60 comprises a light outcoupler 66 configured to outcouple the light signal 40 to extend the light path 50 from the cantilever light guide 60 to the reflector 12. FIG. 9 also illustrates how the open and closed acoustic cavities can be formed by the combination of the first monolithic substrate 100 and the additional monolithic substrate 110.

The apparatus, including cantilever and readout, can therefore be fabricated monolithically using standard SOI platforms. This has the advantage that it permits the apparatus to be miniaturized whilst maintaining a high degree of measurement accuracy.

Note that in the examples illustrated above, the phrase "via (through) the cantilever light guide 60" can be interpreted to mean that light travels within the cantilever light guide 60. The cantilever light guide 60 is a light guide that self supports as a cantilever or is supported by a supporting cantilever.

In some but not necessarily all examples, the cantilever light guide 60 and/or additional cantilever light guide 70, 71 can be ridge waveguides and/or rib waveguides.

Where a structural feature has been described, it may be replaced by means for performing one or more of the functions of the structural feature whether that function or those functions are explicitly or implicitly described.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

I claim:

1. An apparatus comprising:
   a void;
   a reflector;
   an interferometer detector configured to receive a first portion of a light signal at a first phase wherein the first portion of the light signal travels a first interferometric light path from a light source through an optical loop in a reference arm; and
   a cantilever light guide supported at a first end and unsupported at a second opposing end, the cantilever light guide consisting of a light guide, the light guide being a self-supporting member configured to guide a second portion of the light signal at a second phase, wherein the cantilever light guide is supported such that the second opposing end is a free-end of the cantilever light guide and can move within the void,
   wherein the second portion of the light signal travels a second interferometric light path from the light source through the cantilever light guide;
   wherein the cantilever light guide comprises a light outcoupler configured to out-couple the second portion of the light signal to extend the light path from the cantilever light guide to the reflector and wherein the interferometer detector is configured to detect a deflection of the free-end of the cantilever light guide based at least in part on the out-coupled second portion of the light signal after reflection by the reflector; and
   wherein the deflection of the free-end of the cantilever light guide increases a difference between the first phase of the first portion of the light signal and the second phase of the second portion of the light signal to improve a sensitivity of the apparatus.

2. An apparatus as claimed in claim 1, wherein the light outcoupler comprises periodic diffraction elements.

3. An apparatus as claimed in claim 1, wherein the reflector is a plane reflector that is substantially parallel to the cantilever light guide when the cantilever light guide is at rest.

4. An apparatus as claimed in claim 1, wherein the cantilever light guide in an integral component of a first substrate and the reflector is an integral component of a second substrate adjacent the first substrate.

5. An apparatus as claimed in claim 1,
   wherein the interferometer detector detects a change in a length of the first interferometric light path compared to the second branch of tho interferometric light path.

6. An apparatus as claimed in claim 1, wherein the interferometer detector is calibrated to measure a deflection of the cantilever light guide.

7. An apparatus as claimed in claim 1, wherein the interferometer detector comprises one or more phase shifters for calibrating the interferometer detector.

8. An apparatus as claimed in claim 1, wherein the second interferometric light path has an outward portion and a return portion.

9. An apparatus as claimed in claim 1, wherein the cantilever light guide and the interferometer detector are formed from a single monolithic substrate.

10. An apparatus as claimed in claim 9, further comprising an additional monolithic substrate defining the reflector.

11. An apparatus as claimed in claim 10, wherein the additional monolithic substrate comprises an excitation radiation source for generating a photoacoustic signal from a sample in the void.

12. A sensing system comprising:
    a void;
    a reflector;
    an interferometer detector configured to receive a first portion of a light signal at a first phase wherein the first portion of the light signal travels a first interferometric light path from a light source through an optical loop in a reference arm; and
    a cantilever light guide supported at a first end and unsupported at a second opposing end, the cantilever light guide consisting of a light guide, the light guide being a self-supporting member configured to guide a second portion of the light signal at a second phase, wherein the cantilever light guide is supported such that the second opposing end is a free-end of the cantilever light guide and can move within the void, wherein the second portion of the light signal travels a second interferometric light path from the light source through the cantilever light guide;
    wherein the cantilever light guide comprises a light outcoupler configured to out-couple the second portion of the light signal to extend the light path from the cantilever light guide to the reflector and wherein the interferometer detector is configured to detect a deflection of the free-end of the cantilever light guide based at least in part on the out-coupled second portion of the light signal after reflection by the reflector;
    wherein the deflection of the free-end of the cantilever light guide increases a difference between the first phase of the first portion of the light signal and the second phase of the second portion of the light signal to improve a sensitivity of the sensing system; and
    wherein the sensing system is configured for atomic force microscopy, microscale chemical sensing, accelerometry or acoustic sensing.

13. An apparatus as claimed in claim 12, wherein the light outcoupler comprises periodic diffraction elements.

14. An apparatus as claimed in claim 12, wherein the reflector is a plane reflector that is substantially parallel to the cantilever light guide when the cantilever light guide is at rest.

15. An apparatus as claimed in claim 12, wherein the cantilever light guide in an integral component of a first substrate and the reflector is an integral component of a second substrate adjacent the first substrate.

16. An apparatus as claimed in claim 12, wherein the interferometer detector is calibrated to measure a deflection of the cantilever light guide.

* * * * *

UNITED STATES PATENT AND TRADEMARK OFFICE
CERTIFICATE OF CORRECTION

| | | |
|---|---|---|
| PATENT NO. | : 11,828,592 B2 | Page 1 of 1 |
| APPLICATION NO. | : 16/841152 | |
| DATED | : November 28, 2023 | |
| INVENTOR(S) | : David Bitauld | |

It is certified that error appears in the above-identified patent and that said Letters Patent is hereby corrected as shown below:

On the Title Page

Item (54): and In the Specification, Column 1, Lines 1-2, Please delete "Apparatus With Cantilever Light Guide" and replace with --Interferometric Cantilever Light Guide With Improved Sensitivity--.

In the Claims

In Claim 5: Column 12, Line 12, delete "branch of tho".

Signed and Sealed this
Thirteenth Day of February, 2024

*Katherine Kelly Vidal*

Katherine Kelly Vidal
*Director of the United States Patent and Trademark Office*